United States Patent
To

(10) Patent No.: US 10,610,338 B2
(45) Date of Patent: *Apr. 7, 2020

(54) DENTAL CLEANING TOOL WITH SECONDARY CLEANING TOOL AND INTEGRATED SHIELD FOR THE SECONDARY CLEANING TOOL

(71) Applicant: World Wide Daily Holdings Company Limited, Hong Kong (CN)

(72) Inventor: Chun Yuen To, Hong Kong (CN)

(73) Assignee: World Wide Daily Holdings Company Limited, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,888

(22) Filed: Oct. 3, 2018

(65) Prior Publication Data
US 2019/0239990 A1    Aug. 8, 2019

Related U.S. Application Data

(63) Continuation of application No. PCT/CN2018/075779, filed on Feb. 8, 2018.

(51) Int. Cl.
*A61C 15/04* (2006.01)
*A61C 15/02* (2006.01)
*A46B 15/00* (2006.01)

(52) U.S. Cl.
CPC ........ *A61C 15/046* (2013.01); *A46B 15/0069* (2013.01); *A46B 2200/108* (2013.01); *A61C 15/02* (2013.01)

(58) Field of Classification Search
CPC ..... A61C 15/046; A61C 15/041; A61C 15/04; A61C 15/02

(Continued)

(56) References Cited

U.S. PATENT DOCUMENTS

| 2012/0111348 A1* | 5/2012 | Prokopchuk | A61C 15/02 132/200 |
| 2016/0038264 A1 | 2/2016 | Chodorow et al. | |

FOREIGN PATENT DOCUMENTS

| CN | 201798816 U | 4/2011 |
| CN | 205286573 U | 6/2016 |

(Continued)

OTHER PUBLICATIONS

PCT International Search Report and Written Opinion for related application PCT/CN2018/075779 dated Nov. 14, 2018; 11 pp.

*Primary Examiner* — Tatiana L Nobrega
*Assistant Examiner* — Sarah Woodhouse
(74) *Attorney, Agent, or Firm* — Armstrong Teasdale LLP

(57) ABSTRACT

A dental cleaning tool includes a body portion and a secondary cleaning tool. The body portion includes a floss assembly, a handle, a receiving slot, and a shield. The floss assembly includes a first arm, a second arm, and a bridge segment. The first arm and the second arm extend from the bridge segment. The handle is coupled to the floss assembly and extends from the floss assembly. The receiving slot is formed in the handle. The shield is formed on the handle and is configured to cover the receiving slot such that access to the receiving slot is restricted. The secondary cleaning tool is coupled to the bridge segment and is pivotable relative to the bridge segment in at least two degrees of freedom such that the secondary cleaning tool is insertable into the receiving slot from a second direction different than the first direction.

18 Claims, 18 Drawing Sheets

(58) Field of Classification Search
USPC .................................. 132/323, 328, 321, 329
See application file for complete search history.

(56) References Cited

FOREIGN PATENT DOCUMENTS

| | | | | |
|---|---|---|---|---|
| CN | 205339184 U | | 6/2016 | |
| CN | 106491227 A | * | 3/2017 | ............. A61C 15/04 |
| CN | 106491227 A | | 3/2017 | |
| WO | 2017035822 A1 | | 3/2017 | |

\* cited by examiner

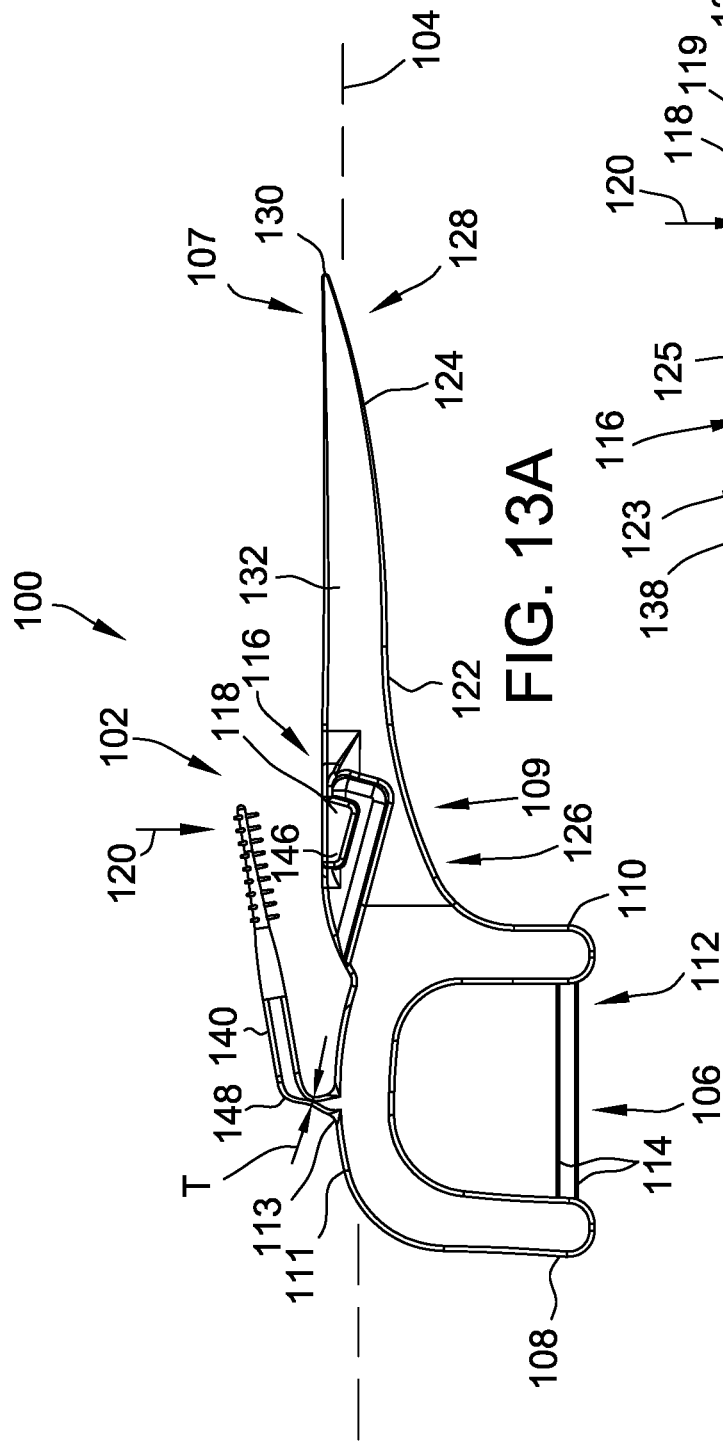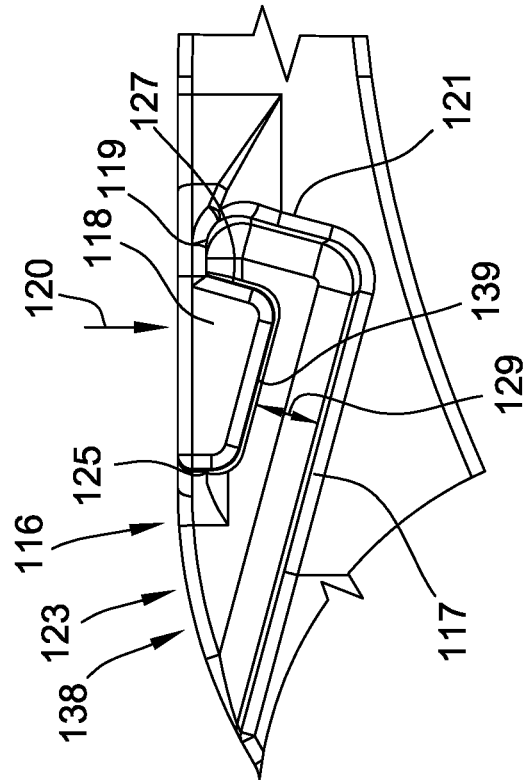

DENTAL CLEANING TOOL WITH SECONDARY CLEANING TOOL AND INTEGRATED SHIELD FOR THE SECONDARY CLEANING TOOL

CROSS REFERENCE TO RELATED APPLICATIONS

This application is a continuation of International Patent Application No. PCT/CN2018/075779, filed Feb. 8, 2018, and is hereby incorporated by reference in its entirety.

FIELD

The field of this disclosure relates generally to dental cleaning tools and, more specifically, to a dental cleaning tool having a secondary cleaning tool and an integrated shield that at least partially covers a receiving slot configured to selectively stow the secondary cleaning tool therein.

BACKGROUND

Dental cleaning tools are used to remove food remnants and/or build-up from the surface of or between teeth. Some known dental cleaning tools include a brush for cleaning the surface of teeth. Other known dental cleaning tools include floss and/or a pick for removing or loosening food remnants (or other debris) from between the user's teeth. Moreover, at least some known dental cleaning tools include a cleaning instrument that is moveable between a deployed position when in use and a stowed position when being stored within the tool. However, many known dental cleaning tools implement bulky and complex mechanical means for shielding the cleaning instrument when in the stowed position. In addition, the cleaning instrument or shielding component may be an independent component separate from the dental cleaning tools such that the cleaning instrument or shielding component may be lost when deployed from the dental cleaning tools.

As such, there is a need for a simple and cost effective dental cleaning tool having a secondary cleaning tool selectively moveable between a deployed position and a stowed position, wherein the secondary cleaning tool is disposed within a slot and shielded by a portion of the dental cleaning tool when in the stowed position.

BRIEF DESCRIPTION

In one aspect, a dental cleaning tool generally comprises a body portion defining a longitudinal axis of the dental cleaning tool and a secondary cleaning tool. The body portion includes a floss assembly, a handle, a receiving slot, and a shield. The floss assembly includes a first arm, a second arm, and a bridge segment. The first arm and the second arm extend from the bridge segment substantially perpendicularly relative to the longitudinal axis. The handle is coupled to the floss assembly and extends from the floss assembly substantially parallel to the longitudinal axis. The receiving slot is formed in the handle. The shield is formed on the handle and is configured to cover at least a portion of the receiving slot such that access to the receiving slot is restricted from a first direction. The secondary cleaning tool is coupled to the bridge segment and is pivotable relative to the bridge segment in at least two degrees of freedom such that the secondary cleaning tool is insertable into the receiving slot from a second direction different than the first direction.

In another aspect, a dental cleaning tool generally comprises a body portion defining a longitudinal axis of the dental cleaning tool and a secondary cleaning tool. The body portion includes a floss assembly, a handle, and a receiving slot. The floss assembly includes a first arm, a second arm, and a bridge segment. The first arm and the second arm extend from the bridge segment substantially perpendicularly relative to the longitudinal axis. The handle is coupled to the floss assembly and extends from the floss assembly substantially parallel to the longitudinal axis. The receiving slot is formed in the handle. The receiving slot is covered, in part, by a shield extending from a portion of the handle. The shield is configured to cover the receiving slot such that access to the receiving slot is restricted from a first direction. The secondary cleaning tool coupled to the bridge segment and is pivotable relative to the bridge segment such that the secondary cleaning tool is insertable into the receiving slot in a stowed position from a deployed position.

In yet another aspect, a dental cleaning tool generally comprises a body portion defining a longitudinal axis of the dental cleaning tool and a secondary cleaning tool. The body portion includes a floss assembly, a handle, and a receiving slot. The floss assembly includes a first arm, a second arm, and a bridge segment. The first arm and the second arm extend from the bridge segment substantially perpendicularly relative to the longitudinal axis. The handle is coupled to the floss assembly and extends from the floss assembly substantially parallel to the longitudinal axis. The receiving slot is formed in the handle. The receiving slot is covered, in part, by a shield extending from a portion of the handle. The secondary cleaning tool is coupled to the bridge segment via a living hinge. The secondary cleaning tool is pivotable relative to the bridge segment about the living hinge in at least two degrees of freedom such that the secondary cleaning tool is insertable into the receiving slot by moving the secondary cleaning tool in at least two directions about the living hinge.

BRIEF DESCRIPTION OF THE DRAWINGS

FIG. 13A is a side view of the dental cleaning tool seen in FIG. 9, the secondary cleaning tool being illustrated in the deployed position;

FIG. 13B is a side view of a receiving slot of the dental cleaning tool seen in FIG. 13A, the secondary cleaning tool being illustrated in the deployed position;

DETAILED DESCRIPTION OF THE DRAWINGS

Figure 16:
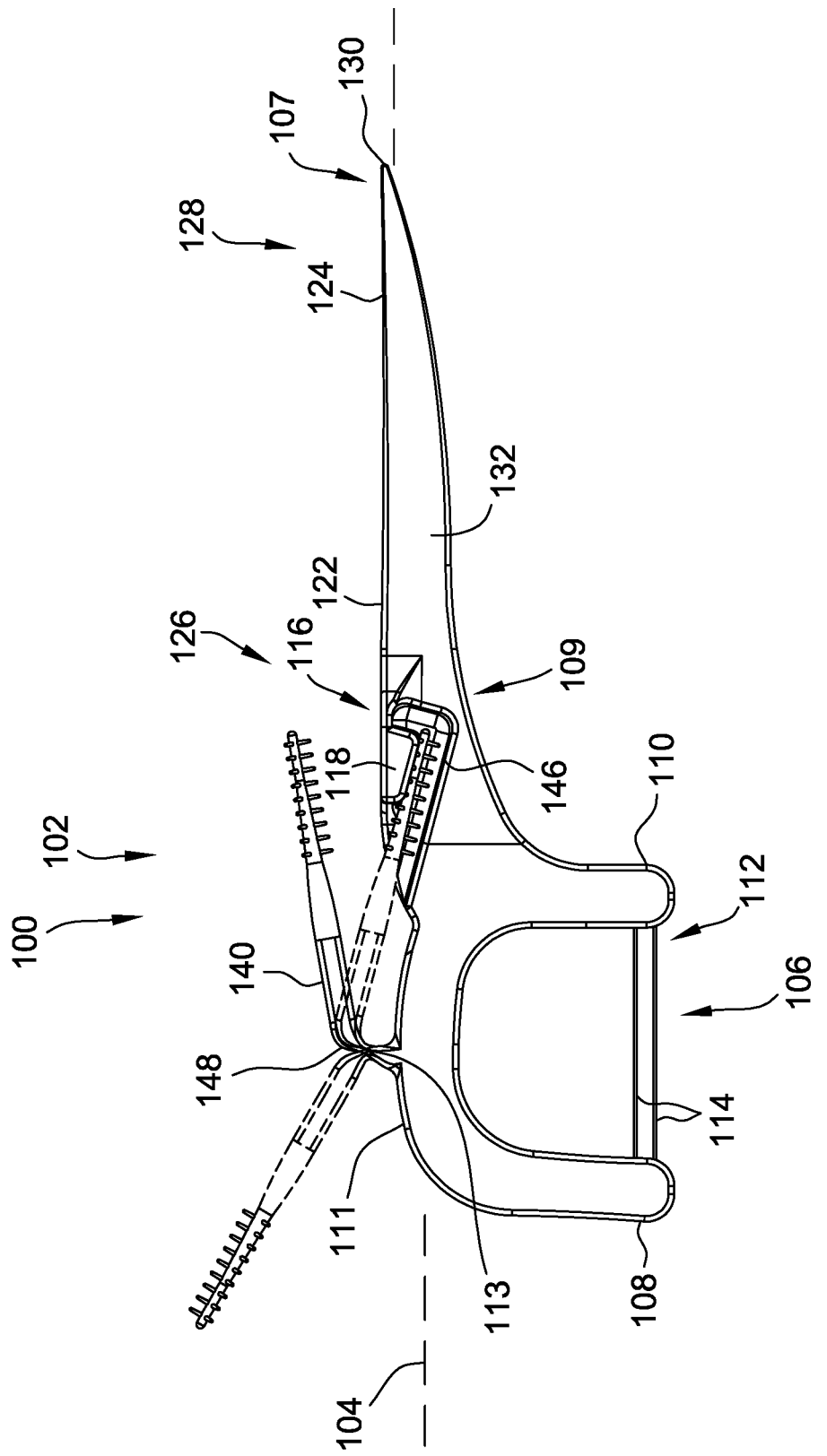
FIG. 16 is a side view of the dental cleaning tool seen in FIG. 9, the secondary cleaning tool being illustrated in on of multiple deployed positions in solid lines, in another deployed position in dashed lines, and in the stowed position in dashed lines.
Figure 17:
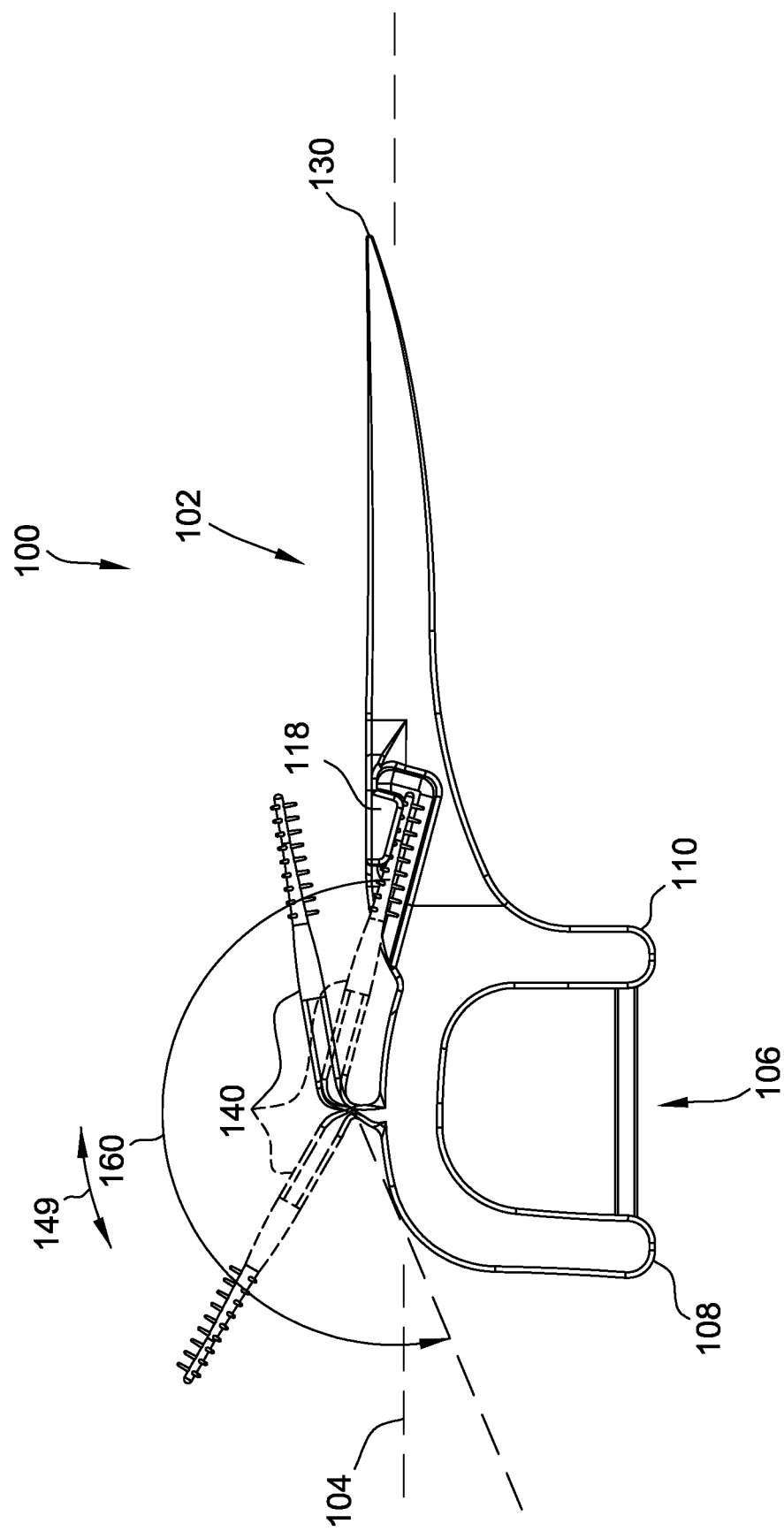
FIG. 17 is a side view of the dental cleaning tool seen in FIG. 9, the secondary cleaning tool being illustrated in one of multiple deployed positions in solid lines, in another deployed position in dashed lines, and in the stowed position in dashed lines to illustrate the full range of motion of the secondary cleaning tool.
Figure 18:
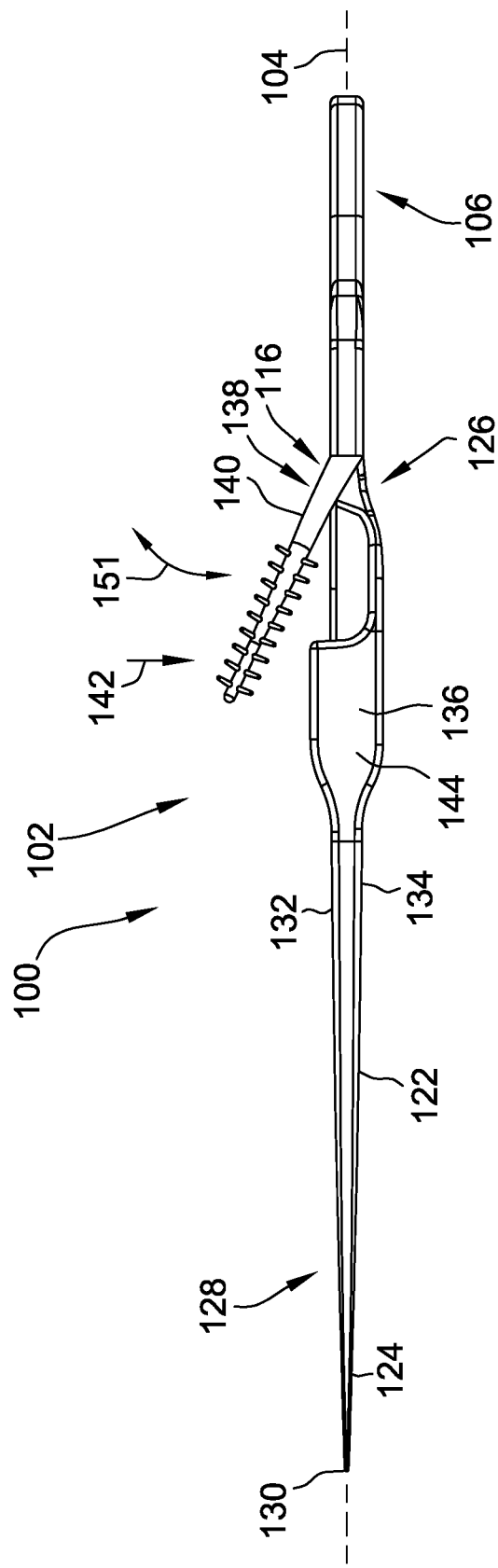
FIG. 18 is a top view of the dental cleaning tool seen in FIG. 9, the secondary cleaning tool being illustrated in the deployed position in the process of being moved from the stowed position to the deployed position.

FIGS. 1-18 illustrate one suitable embodiment of a dental cleaning tool, indicated generally at 100, of the present disclosure. FIGS. 1-8B illustrate the dental cleaning tool 100 in a stowed position, FIGS. 9-15 illustrate the dental cleaning tool in a deployed position, FIGS. 16-18 illustrate the dental cleaning tool in various positions between the stowed and the deployed positions, including at least one in-use position, and FIG. 8B is a sectional view of dental cleaning tool 100 along sectional line 8B. As illustrated herein, the dental cleaning tool 100 includes a body portion, indicated generally at 102, defining a longitudinal axis 104 of the dental cleaning tool. The body portion 102 includes a floss assembly, indicated generally at 106, having a first arm 108 and a second arm 110 extending substantially perpendicularly relative to the longitudinal axis 104 of the dental cleaning tool 100. The floss assembly 106 further includes a bridge segment 111 of the body portion 102 that is oriented to extend substantially coaxially with the longitudinal axis 104. The first arm 108 and the second arm 110 are spaced from each other by a distance such that a gap, indicated generally at 112, is defined therebetween. The dental cleaning tool 100 includes at least one length of floss 114 that spans the gap 112 and that is coupled between the first arm 108 and the second arm 110. In one suitable embodiment, the floss 114 is held in tension across the gap 112 to facilitate removing or loosening food remnants or other debris when inserted between a user's teeth. In the illustrated embodiment, two lengths of floss 114 are shown spanning the gap 112 between the first arm 108 and the second arm 110. In other embodiments, dental cleaning tool 100 may have only a single strand of floss 114 between arms 108 and 110. Generally, dental cleaning tool 100 may include any suitable number of strands of floss 114 between arms 108 and 110. The bridge segment 111 has a curved shape with an apex 113 located at a point on the bridge segment 111 furthest from the floss 114. In the illustrated embodiment, the apex 113 is located substantially midway along a length 115 (shown in FIG. 5) of the bridge segment 111.

The body portion 102 further includes a handle 122 extending from the floss assembly 106, and a toothpick member 124 extending from a distal end 107 of the handle 122. The floss assembly 106 is defined at a first end, indicated at 126, of the body portion 102, and the toothpick member 124 is defined at a second end, indicated at 128, of the body portion 102. The body portion 102 is tapered such that the toothpick member 124 includes a pointed tip 130 at the second end 128 thereof.

The body portion 102 further includes a receiving slot, indicated generally at 116, formed in a proximate end 109 of the handle 122, and a shield, indicated generally at 118, formed on the handle 122 of the body portion 102. The receiving slot 116 extends along the handle 122 of the body portion 102, and the shield 118 is positioned to at least partially cover the receiving slot 116. Moreover, in the example embodiment, the receiving slot 116 is generally aligned with the longitudinal axis 104. The shield 118 is oriented to restrict access to the receiving slot 116 from a first direction 120 (shown in FIGS. 5 and 13A), as will be explained in further detail below. In addition, in one embodiment, the handle 122 and the shield 118 are formed as a monolithic (i.e., one piece) integral structure.

In the exemplary embodiment, the body portion 102 includes a first side (shown in FIGS. 5, 8, and 13B), indicated at 132, and a second side, indicated at 134 (shown in FIGS. 6 and 14), opposing the first side 132. As shown, the receiving slot 116 is formed in the handle 122 on the first side 132 of the body portion 102. Moreover, the handle 122 includes a top face or surface 136 (shown in FIGS. 7 and 15) extending between the first side 132 and the second side 134 of the body portion 102. The receiving slot 116 extends along the body portion 102 such that a finger tab opening 138 (shown in FIGS. 7 and 15) is defined in the top face 136 of the handle 122. The finger tab opening 138 is also at least partially defined by a bottom edge 139 of the shield 118. The finger tab opening 138 provides access to the receiving slot 116 to facilitate deployment of a cleaning instrument therefrom, as will be explained in further detail below.

The receiving slot 116, the shield 118, and the finger tab opening 138 are all positioned substantially midway along a length 137 (shown in FIGS. 7 and 15) of the dental cleaning tool 100. Specifically, the receiving slot 116, the shield 118, and the finger tab opening 138 are all positioned on the proximate end 109 of the handle 122 proximate the floss assembly 106. Referring to FIG. 13B, the receiving slot 116 includes a bottom edge 117, a top edge 119, an end edge 121, and an open portion 123. The shield 118 includes the bottom edge 139, a first end edge 125, and a second end edge 127.

The bottom edge 117 of the receiving slot 116 extends from the open portion 123 of the receiving slot 116 to the end edge 121 of the receiving slot 116. The end edge 121 of the receiving slot 116 extends from the bottom edge 117 of the receiving slot 116 to the top edge 119 of the receiving slot 116. The top edge 119 of the receiving slot 116 extends from the end edge 121 of the receiving slot 116 to the shield 118. The open portion 123 of the receiving slot 116 extends from the shield 118 to the bottom edge 117 of the receiving slot 116. The open portion 123 of the receiving slot 116 allows access to the receiving slot 116. The first end edge 125 of the shield 118 extends from the open portion 123 of the receiving slot 116 to the bottom edge 139 of the shield 118. The bottom edge 139 of the shield 118 extends from the first end edge 125 of the shield 118 to the second end edge 127 of the shield 118. The second end edge 127 of the shield 118 extends from the bottom edge 139 of the shield 118 to the top edge 119 of the receiving slop 116.

The bottom edge 117 of receiving slot 116 and the bottom edge 139 of the shield 118 are oriented parallel to each other and are oriented obliquely relative to longitudinal axis 104. Additionally, the bottom edge 117 of receiving slot 116 and the bottom edge 139 of the shield 118 are spaced apart from each other by a bottom edge distance 129 to allow access to receiving slot 116. That is, the shield 118 does not extend to the bottom edge 117 of receiving slot 116 to allow access to receiving slot 116. Additionally, the end edge 121 of the receiving slot 116 and the second end edge 127 of the shield 118 are oriented parallel to each other and are oriented obliquely relative to longitudinal axis 104.

The receiving slot 116 is a straight indentation or cavity formed in the handle 122 oriented obliquely to the longitudinal axis 104. The shield 118 extends over a portion of the receiving slot 116 to define the finger tab opening 138. The shield 118 does not extend to the bottom edge 117 of the receiving slot 116 or to the end edge 121 of the receiving slot 116. As such, the finger tab opening 138 has an "L" shape when viewed from the side.

The dental cleaning tool 100 also includes a secondary cleaning tool 140 coupled to the bridge segment 111 at the apex 113 of the bridge segment 111 or substantially midway along the length 115 of the bridge segment 111. The secondary cleaning tool 140 may be any suitable cleaning instrument that enables the dental cleaning tool 100 to function as described herein. Example secondary cleaning tools include, but are not limited to, a bristled cleaning member and a toothpick member. In the illustrated embodiment, for example, the secondary cleaning tool 140 is a bristled cleaning member (or brush). In one suitable embodiment, the secondary cleaning tool 140 is pivotable relative to the bridge segment 111 in at least two degrees of freedom such that the secondary cleaning tool 140 is insertable into the receiving slot 116 from a second direction 142 (shown in FIGS. 7 and 15) different than the first direction 120.

For example, as described above, the shield 118 is oriented to restrict access to the receiving slot 116 from the first direction 120. More specifically, the shield 118 includes a first portion 144 (shown in FIGS. 7 and 15) oriented to restrict access to the receiving slot 116 from the first direction 120, and a second portion, indicated generally at 146 (shown in FIGS. 5 and 13A), oriented to partially restrict access to the receiving slot 116 from second direction 142. The first portion 144 of the shield 118 is formed on, and extends along, the handle 122 of body portion 102. In the example embodiment, the first portion 144 extends along the handle 122 such that a straight edge is formed on the body portion 102. The first portion 144 also has a width relative a thickness of the body portion 102 such that the second portion 146 is positioned a distance from the first side 132 of the body portion 102, which necessitates the secondary cleaning tool 140 to be pivotable relative to the bridge segment 111 in at least two degrees of freedom to be insertable into the receiving slot 116.

The second portion 146 of the shield 118 is oriented generally perpendicular relative to the first portion 144 such that the shield 118 extends over the receiving slot 116. For example, in one embodiment, the second portion 146 includes a rounded edge 147 (shown in FIGS. 1 and 8B) positioned proximate to the first portion 144. The rounded edge 147 provides a contour to the shield 118 such that the second portion 146 is oriented perpendicularly relative to the first portion 144. The second portion 146 extends a distance from the first portion 144 and is oriented such that the receiving slot 116 is partially exposed when viewed from the first side 132 of the body portion 102. More specifically, the bottom edge 139 of the shield 118 or the second portion 146 oriented obliquely relative to the longitudinal axis 104 of the body portion 102. In one embodiment, the second portion 146 extends a distance from the first portion 144 such that, when viewed from the first side 132 of the body portion 102, the bottom edge 139 extends along the receiving slot 116. As such, the shield 118 facilitates restricting access by the secondary cleaning tool 140 to the receiving slot 116 when in the deployed position, and facilitates retaining the secondary cleaning tool 140 within the receiving slot 116 when in the stowed position. The shield 118 also facilitates protecting the secondary cleaning tool 140 when in the stowed position by partially covering a portion of the secondary cleaning tool 140 when in the stowed position.

In one suitable embodiment, a bendable tab 148 (e.g., a living hinge) extends between the body portion 102 and the secondary cleaning tool 140. The bendable tab 148 is coupled to the bridge segment 111 at the apex 113 of the bridge segment 111 or substantially midway along the length 115 of the bridge segment 111. The bendable tab 148 is dimensioned such that the secondary cleaning tool 140 is pivotable in a first degree of freedom 149 (shown in FIG. 17) when a first force is applied thereto, and such that the secondary cleaning tool 140 is pivotable in a second degree of freedom 151 (shown in FIG. 18) when a second force, greater than the first force, is applied thereto. As shown in FIG. 18, the secondary cleaning tool 140 pivots around the shield 118 (pivotable in a second degree of freedom 151) when transitioning between the stowed position and the deployed position. That is, when transitioning between the stowed position and the deployed position, the secondary cleaning tool 140 is oriented obliquely to the longitudinal axis 104. For example, the bendable tab 148 has a width W (shown in FIGS. 7 and 15) and a thickness T (shown in FIGS. 13A and 14), and the width W is greater than the thickness T. As such, the bendable tab 148 is dimensioned such that the secondary cleaning tool 140 is stowable within, or deployable from, the receiving slot 116 in a deliberate and intentional manner. That is, the secondary cleaning tool 140 can be manually moved by a user about the bendable tab 148 to selectively move the secondary cleaning tool 140 between the stowed and deployed positions. When in the deployed position, the user may selectively move the secondary cleaning tool 140 into one of various in-use positions based on the ease of use of secondary cleaning tool 140. When in the stowed position, the secondary cleaning tool 140 is oriented obliquely to the longitudinal axis 104 and is ergonomically stored such that the interference to the user while flossing from the secondary cleaning tool 140 is reduced. That is, positioning the secondary cleaning tool 140 on the bridge segment 111 such that the secondary cleaning tool 140 partially overlaps the handle 122 reduces interference to the user during flossing. Additionally, the secondary cleaning tool 140 is spaced apart from the handle 122 when in the stowed position.

Figure 6:
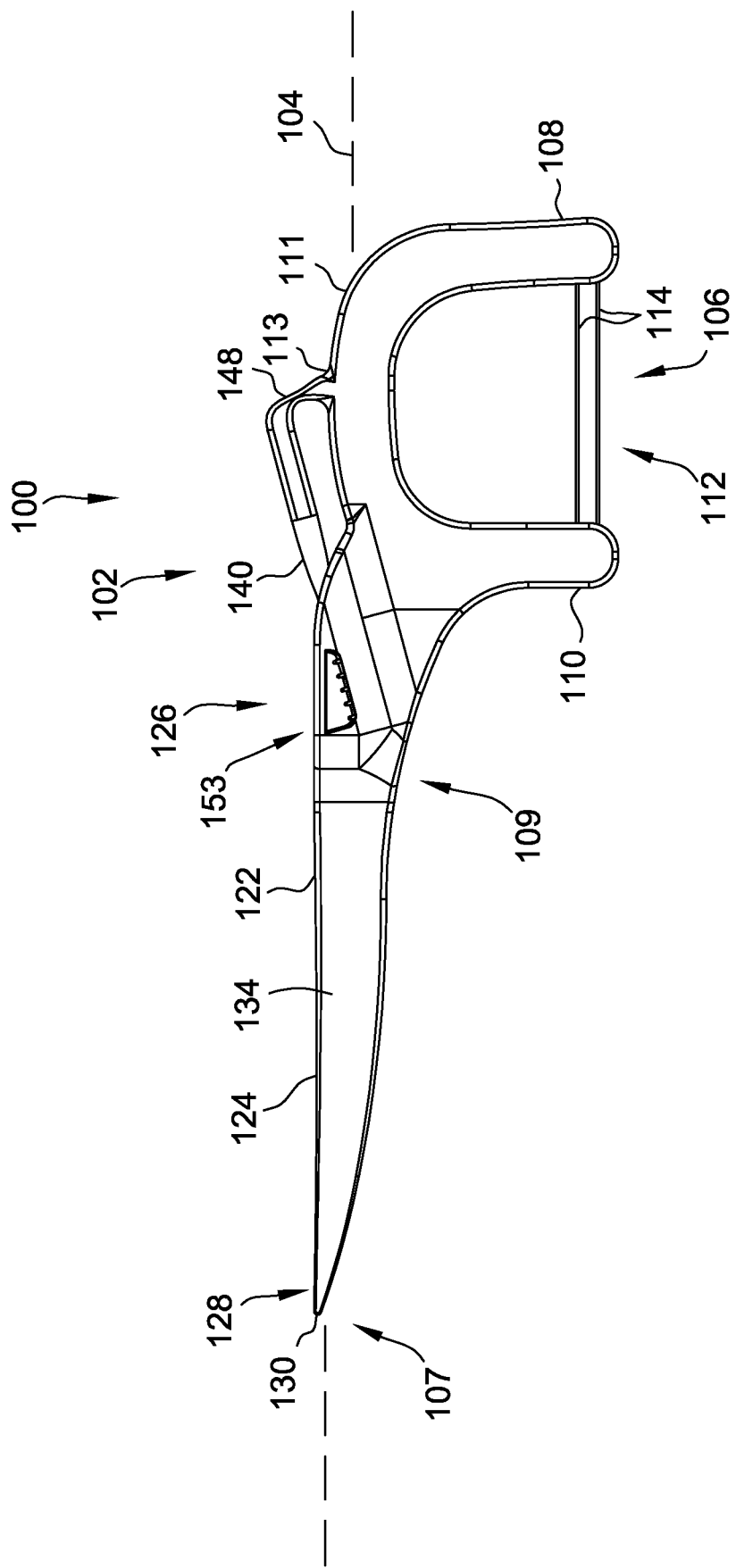
FIG. 6 is a side view of the dental cleaning tool seen in FIG. 4, the secondary cleaning tool being illustrated in the stowed position.
Figure 14:
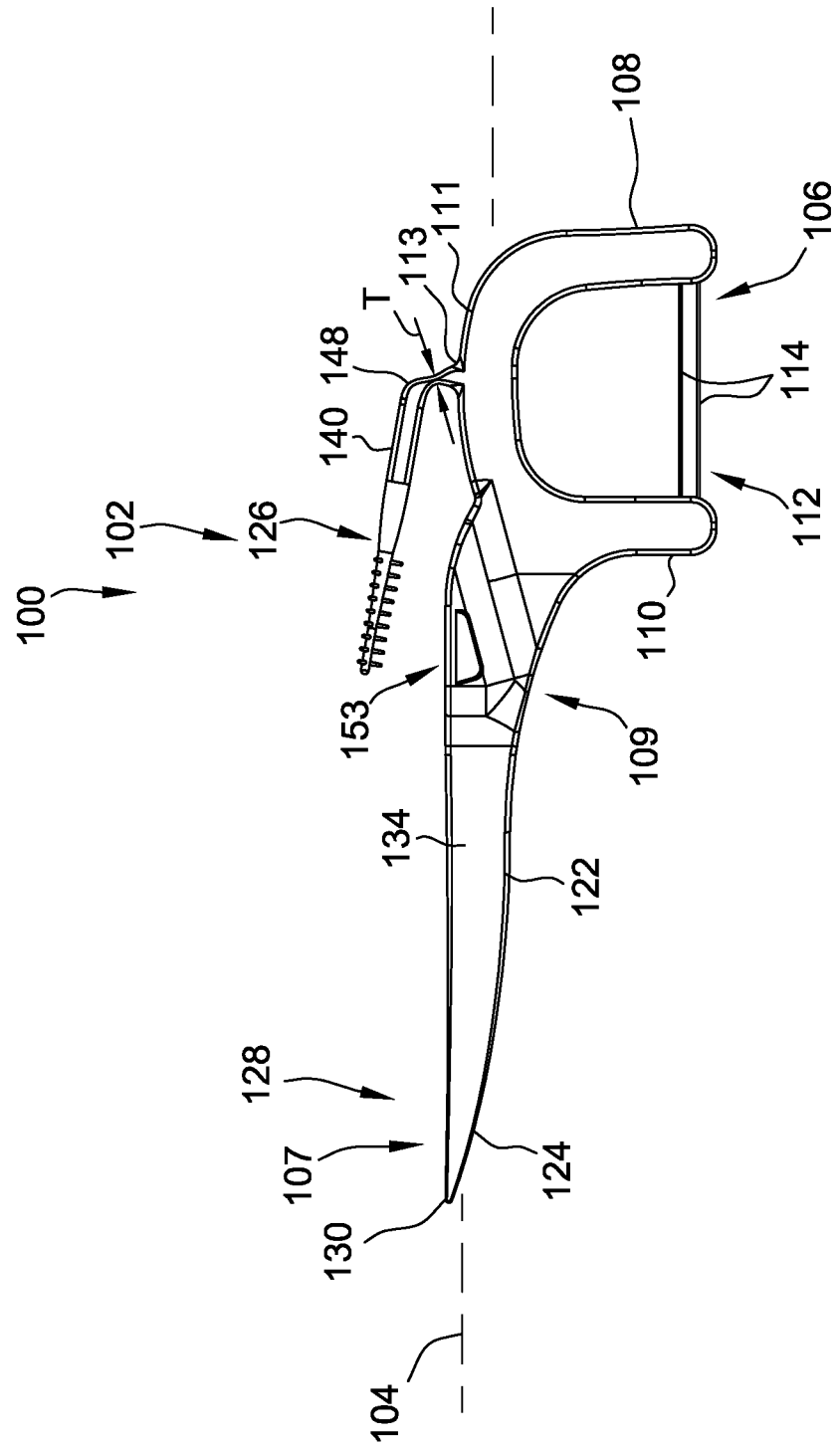
FIG. 14 is a side view of the dental cleaning tool seen in FIG. 12, the secondary cleaning tool being illustrated in the deployed position.

Referring to FIGS. 6, 8B, and 14, the floss assembly 106 further includes a side opening 153 defined on the second side 134 of the body portion 102. The side opening 153 provides a viewing window to the interior of the receiving slot 116 from the second side 134, such that a user of the dental cleaning tool 100 can see whether the secondary cleaning tool 140 is stowed within the receiving slot 116, thereby increasing the aesthetic appeal of, and facilitating interest in, the dental cleaning tool 100 to the user.

Figure 1:
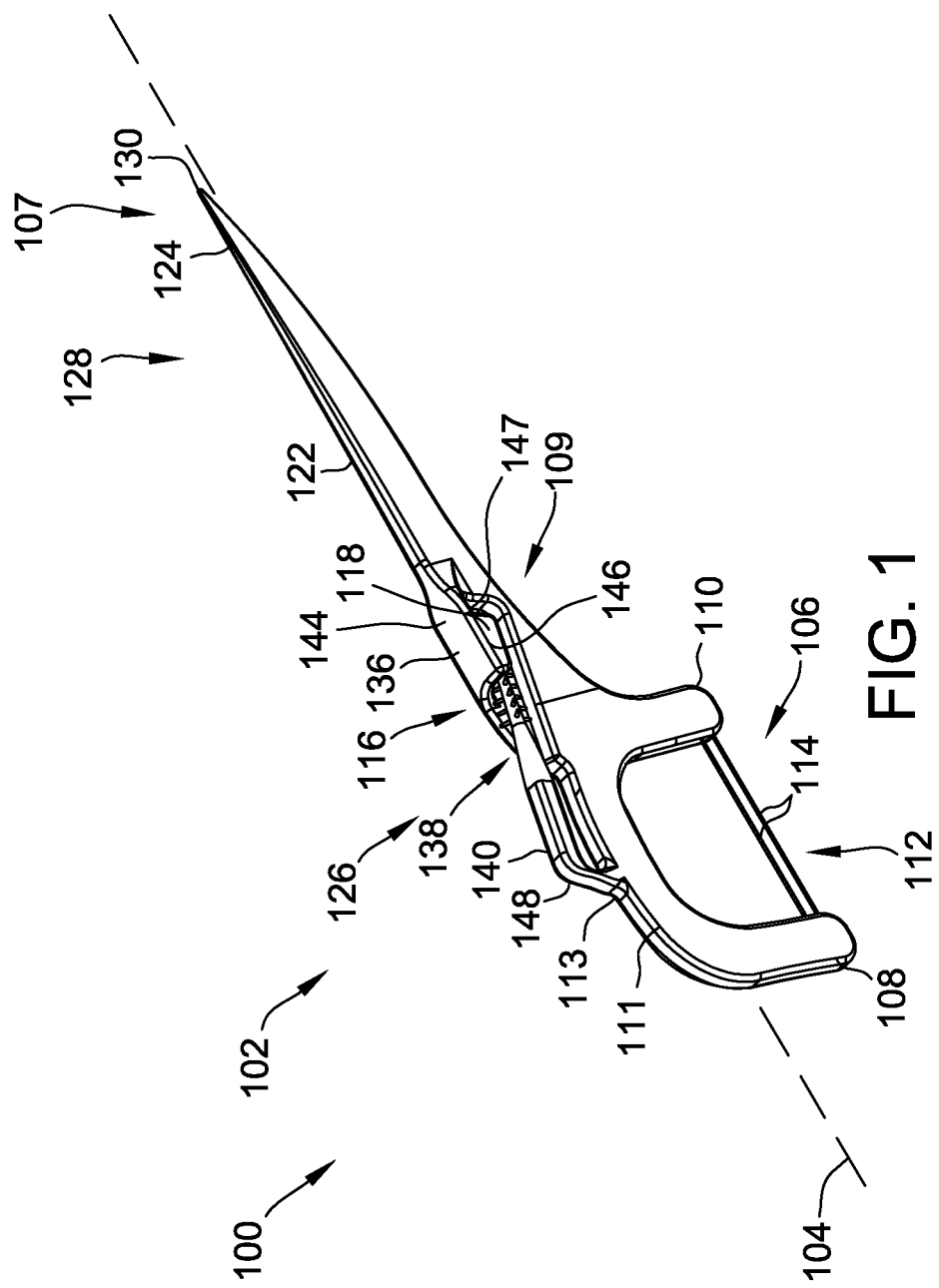
FIG. 1 is a perspective view of one suitable embodiment of a dental cleaning tool of the present disclosure, the dental cleaning tool having a secondary cleaning tool illustrated in a stowed position.
Figure 2:
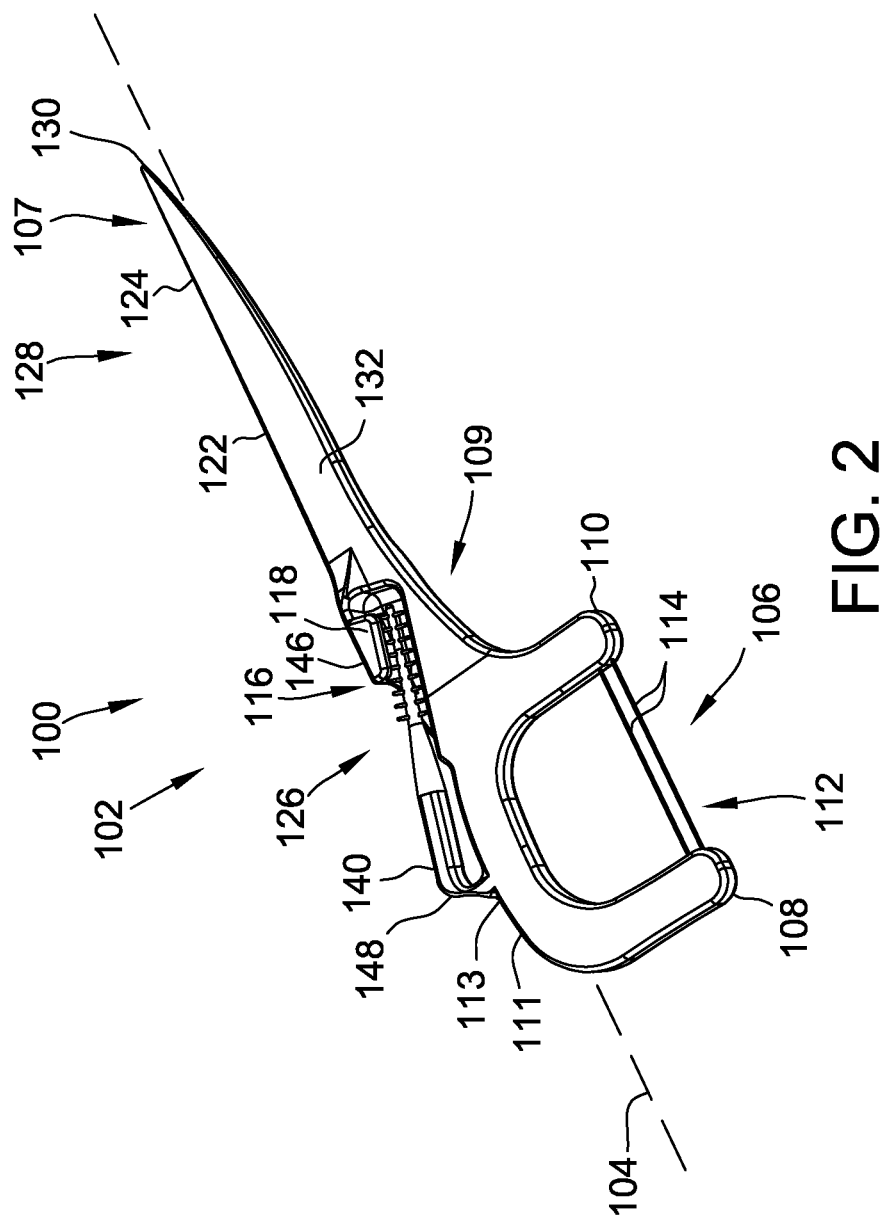
FIG. 2 is a perspective view of the dental cleaning tool seen in FIG. 1 illustrating a bottom of the dental cleaning tool, the secondary cleaning tool being illustrated in the stowed position.
Figure 3:
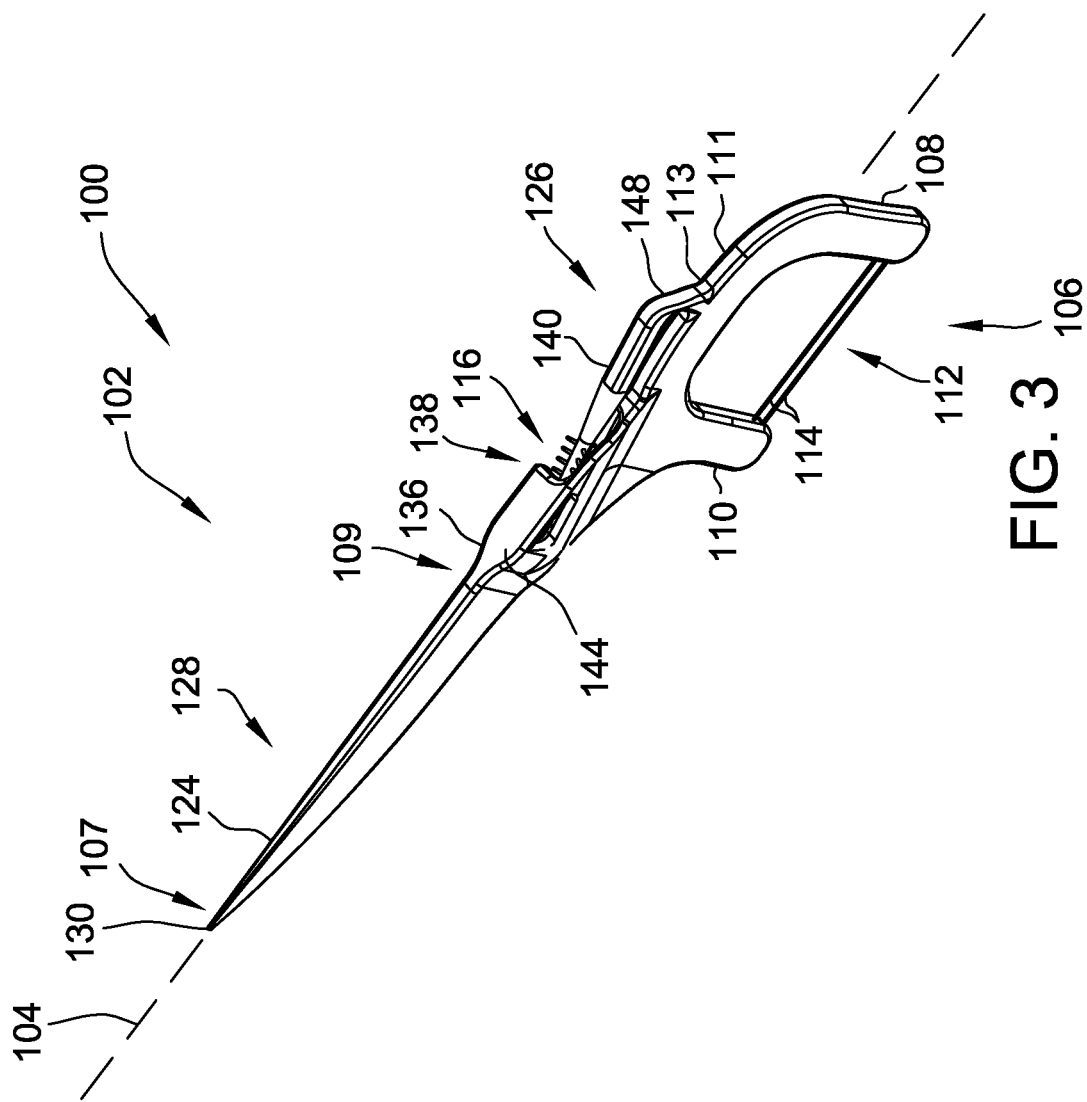
FIG. 3 is a perspective view of the dental cleaning tool seen in FIG. 1 illustrating an opposite side and a top of the dental cleaning tool, the secondary cleaning tool being illustrated in the stowed position.
Figure 4:
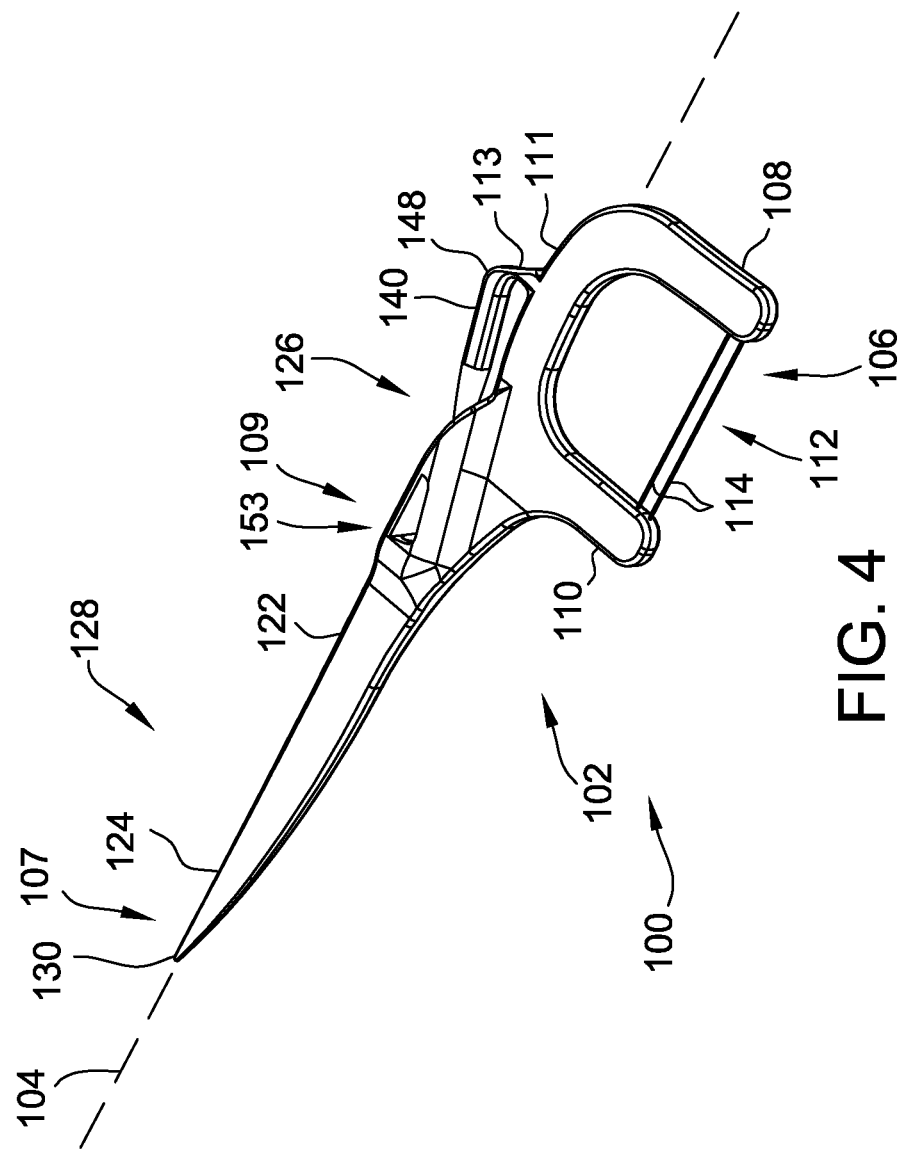
FIG. 4 is a perspective view of the dental cleaning tool seen in FIG. 1 illustrating the opposite side and the bottom of the dental cleaning tool, the secondary cleaning tool being illustrated in the stowed position.
Figure 5:
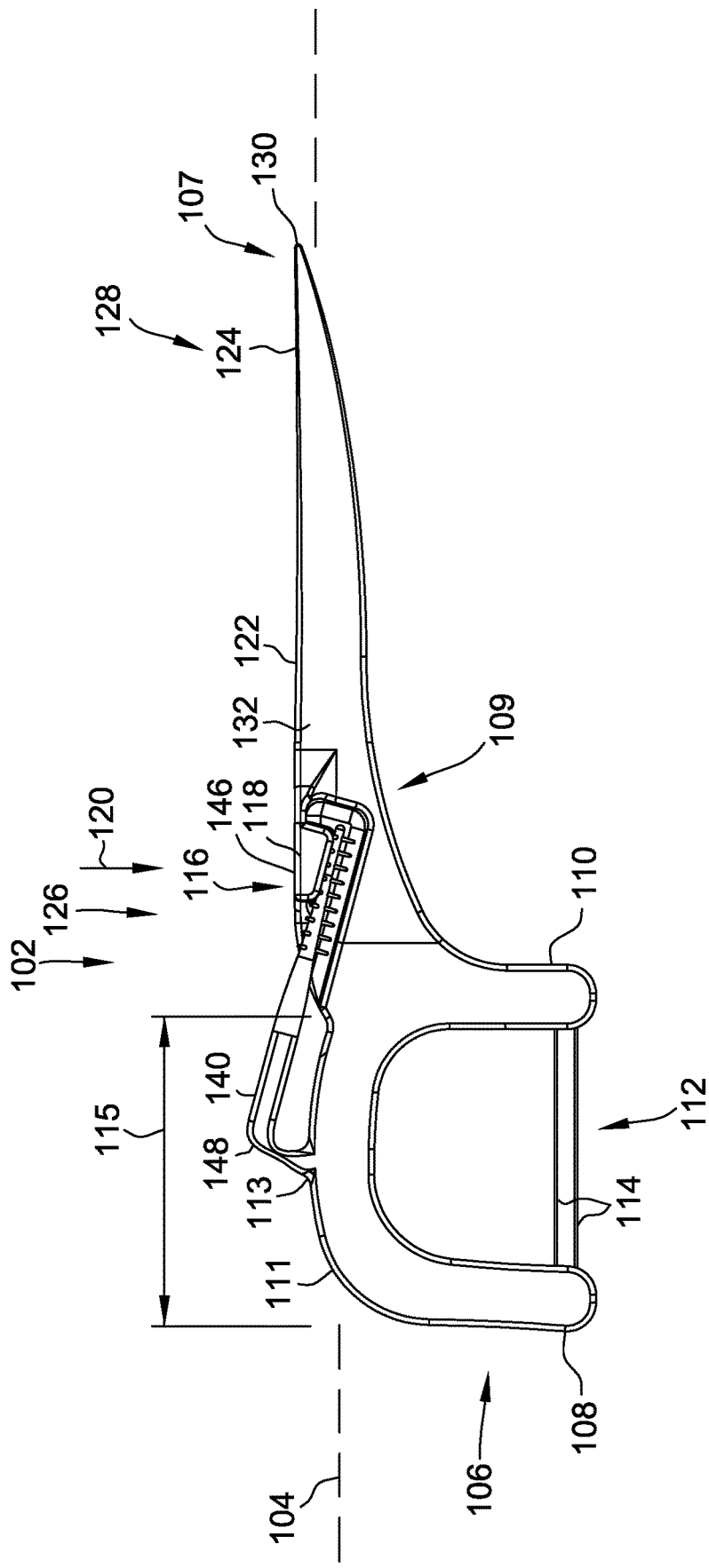
FIG. 5 is a side view of the dental cleaning tool seen in FIG. 1, the secondary cleaning tool being illustrated in the stowed position.

With reference to FIGS. 5 and 13A, the secondary cleaning tool 140 is selectively manually pivotable relative to the bridge segment 111 for positioning the secondary cleaning tool in either the stowed position (shown in FIG. 5) or the deployed position (shown in FIG. 13A). In operation, the secondary cleaning tool 140 is deployed from the stowed position by accessing the secondary cleaning tool 140 via the finger tab opening 138 to release the secondary cleaning tool 140 from underneath the shield 118. More specifically, a user may manually grasp and pivot the secondary cleaning tool 140 in a first rotational direction 150, pivot the secondary cleaning tool 140 away from the first side 132 of the body portion 102, and then pivot the secondary cleaning tool 140 in a second rotational direction 152 to deploy the secondary cleaning tool 140. To stow the secondary cleaning tool 140 from the deployed position, a user may manually grasp and pivot the secondary cleaning tool 140 in the first rotational direction 150, pivot the secondary cleaning tool 140 away from the first side 132 of the body portion 102 such that the secondary cleaning tool 140 clears the shield 118 when rotating in the first rotational direction 150, and then pivoting the secondary cleaning tool 140 towards the first side 132 of the body portion 102 such that the secondary cleaning tool 140 is inserted within the receiving slot 116.

With reference to FIG. 17, the secondary cleaning tool 140 is pivotable about the bendable tab 148 in multiple orientations when in the deployed position. The secondary cleaning tool 140 and the handle 122 form an angle 160 therebetween. The angle 160 ranges from −10 degrees to 0 degrees when the secondary cleaning tool 140 is in the stowed position, and the angle 160 ranges from 200 degrees to 230 degrees when the secondary cleaning tool 140 is fully pivoted about the bendable tab 148. The angle 160 includes any angle from about −10 degrees to and including about 230 degrees. Additionally, the deployed position includes multiple orientations of secondary cleaning tool 140 at multiple angles 160 in which secondary cleaning tool 140 may be used. For example, one in-use position is when the secondary cleaning tool 140 is oriented substantially perpendicular to longitudinal axis 104 such that the angle 160 is approximately 90 degrees. Another example in-use position is when the secondary cleaning tool 140 is oriented substantially parallel to longitudinal axis 104 such that the angle 160 is approximately 180 degrees.

Figure 7:
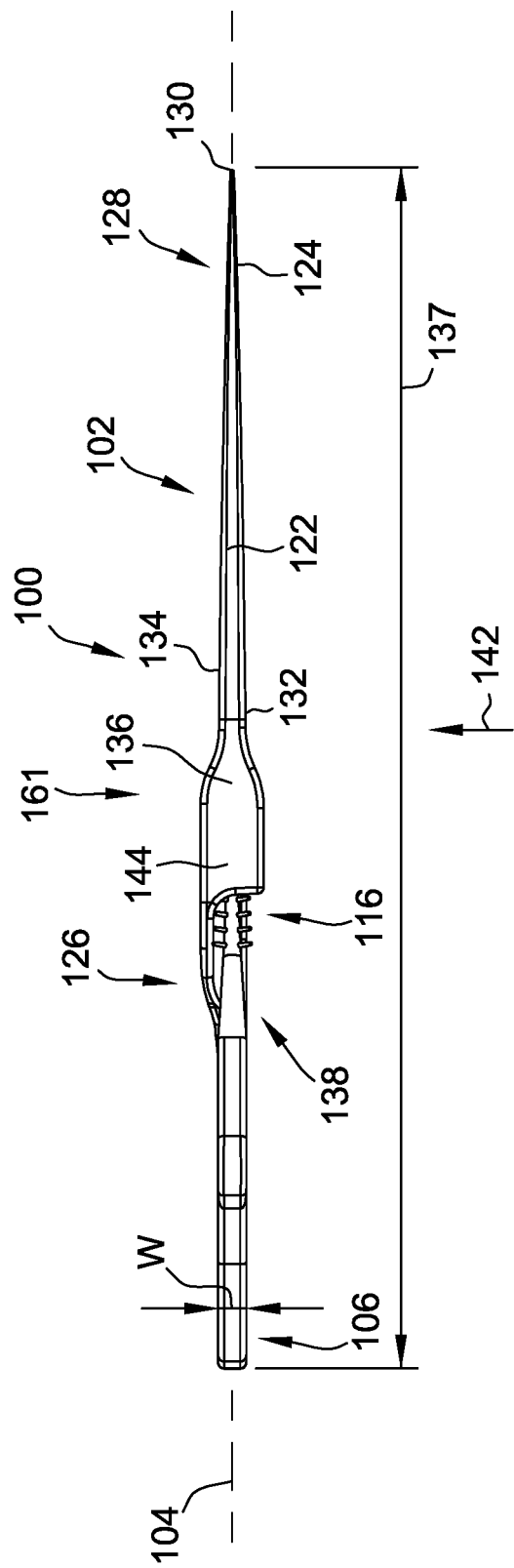
FIG. 7 is a top view of the dental cleaning tool seen in FIG. 1, the secondary cleaning tool being illustrated in the stowed position.
Figure 8:
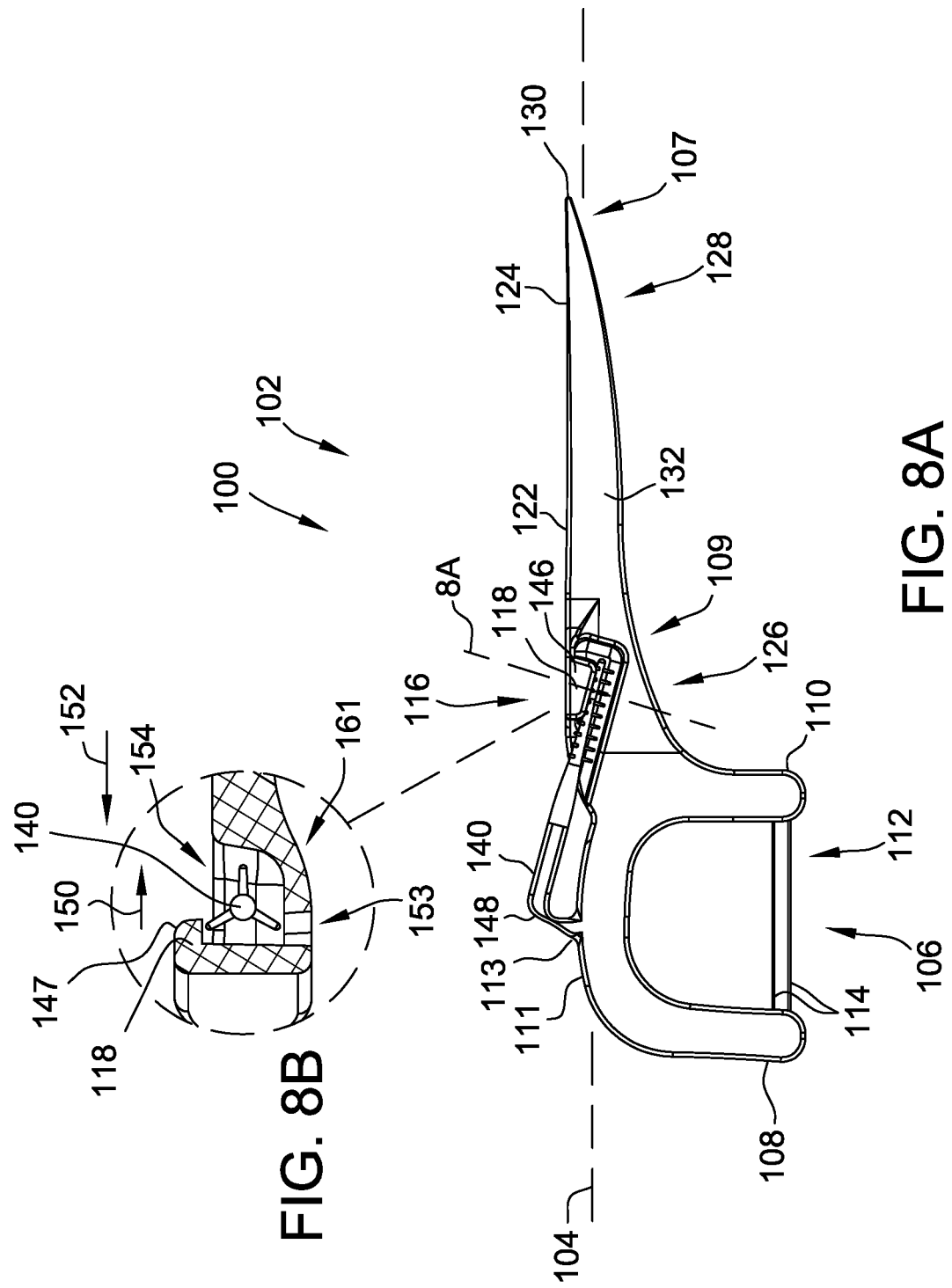
FIG. 8A is a side view of the dental cleaning tool seen in FIG. 1 illustrating the position of a section view of the dental cleaning tool, the secondary cleaning tool being illustrated in the stowed position.
FIG. 8B is a sectional view of the dental cleaning tool seen in FIG. 8A, the secondary cleaning tool being illustrated in the stowed position.
Figure 9:
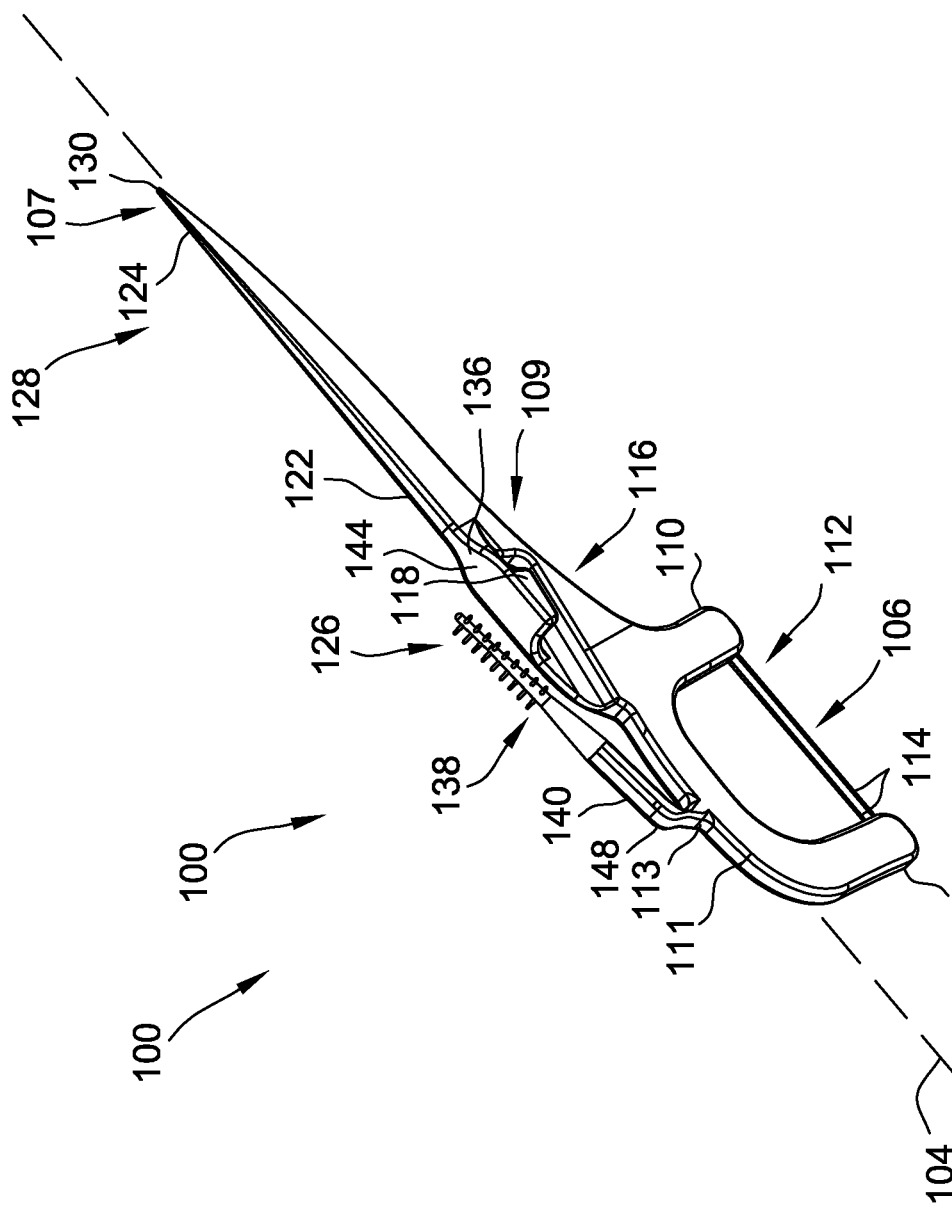
FIG. 9 is a perspective view of the dental cleaning tool, the secondary cleaning tool illustrated in a deployed position.
Figure 10:
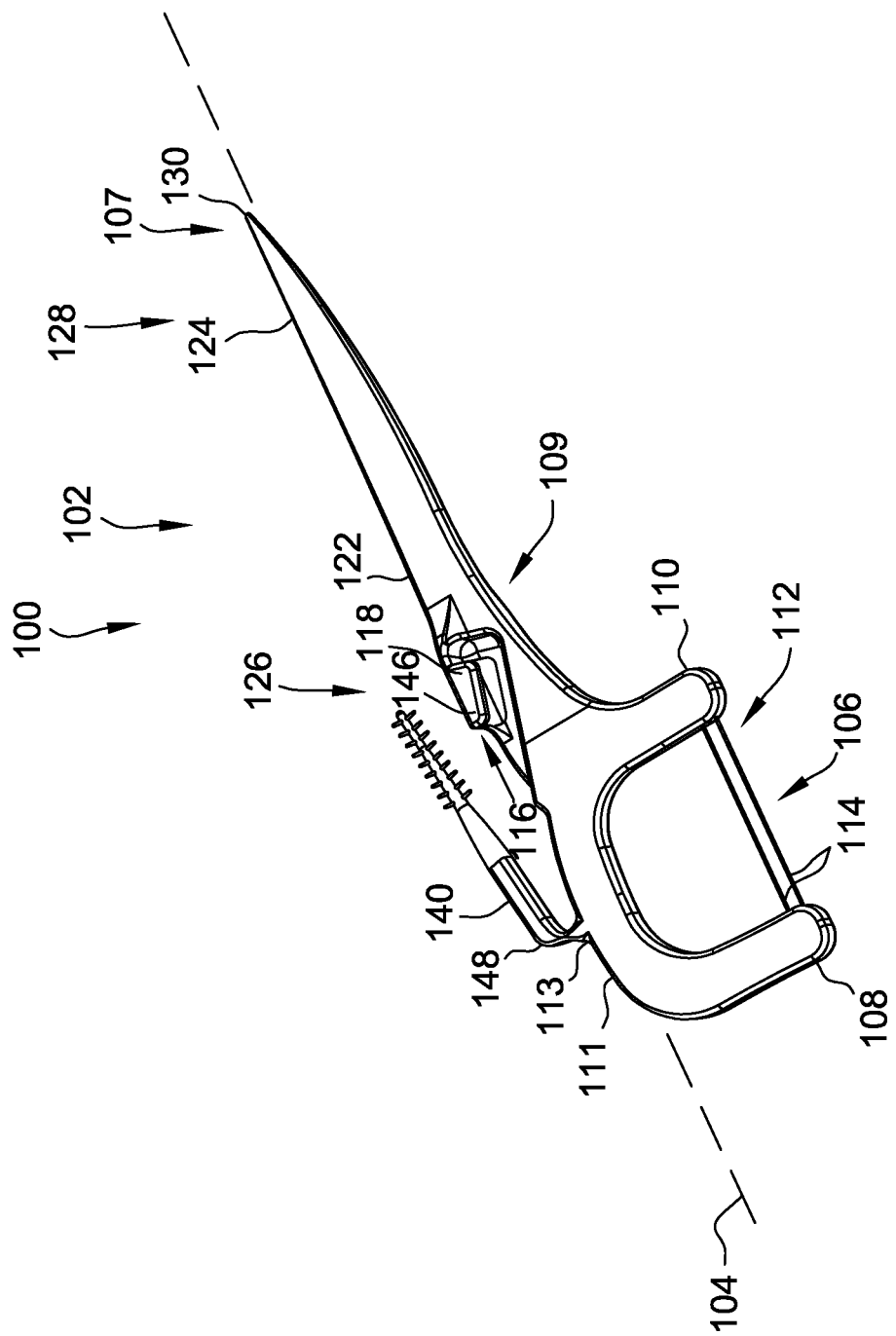
FIG. 10 is a perspective view of the dental cleaning tool seen in FIG. 9 illustrating the bottom of the dental cleaning tool, the secondary cleaning tool being illustrated in the deployed position.
Figure 11:
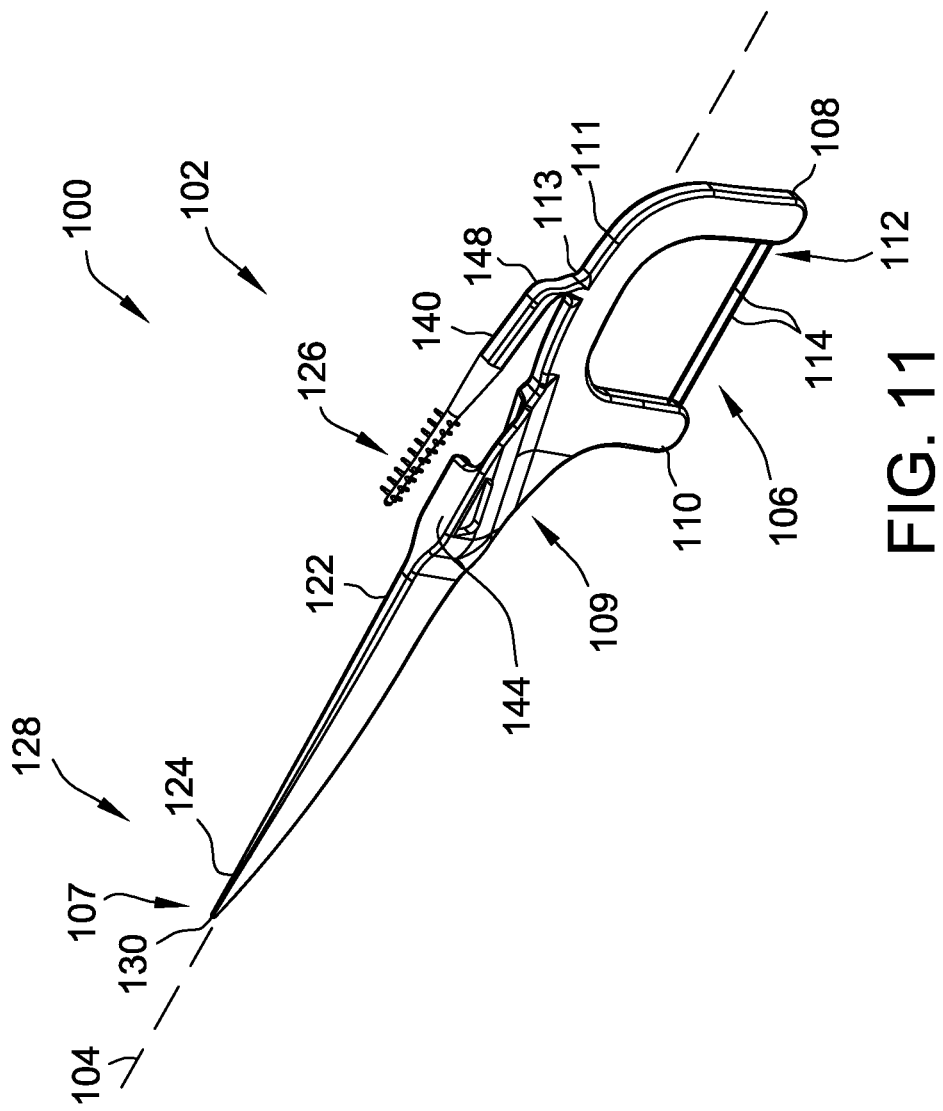
FIG. 11 is a perspective view of the dental cleaning tool seen in FIG. 9 illustrating an opposite side and a top of the dental cleaning tool, the secondary cleaning tool being illustrated in the deployed position.
Figure 12:
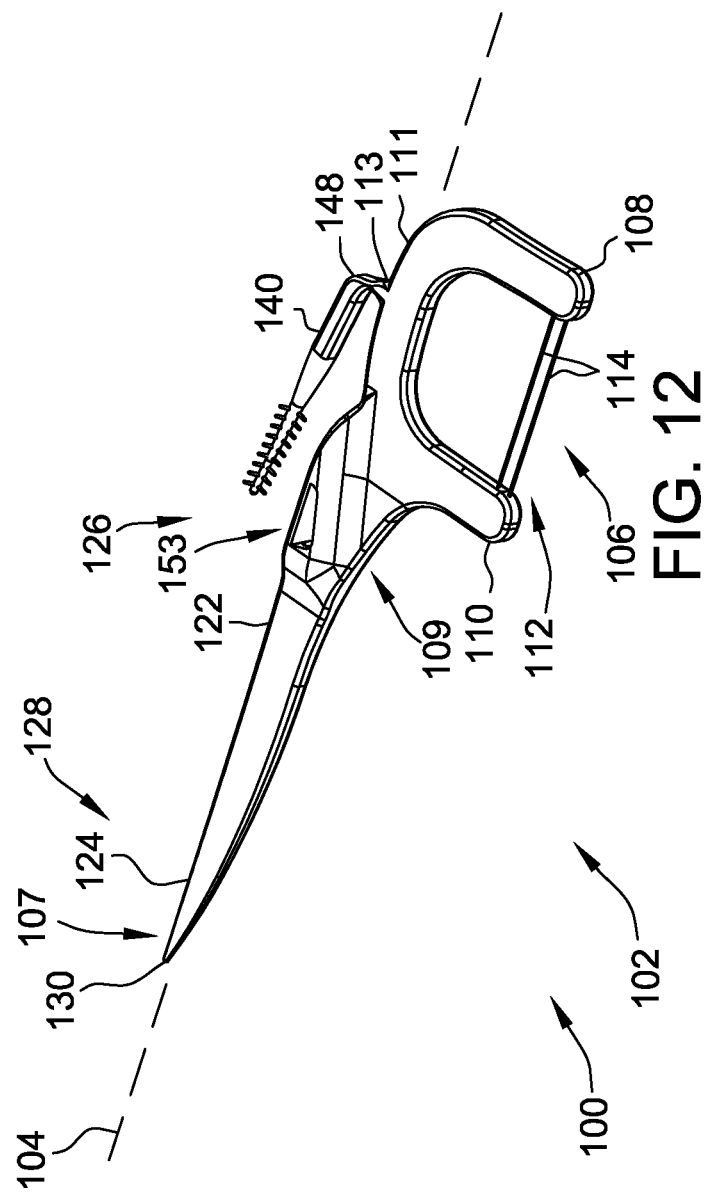
FIG. 12 is a perspective view of the dental cleaning tool seen in FIG. 9 illustrating the opposite side and the bottom of the dental cleaning tool, the secondary cleaning tool being illustrated in the deployed position.
Figure 15:
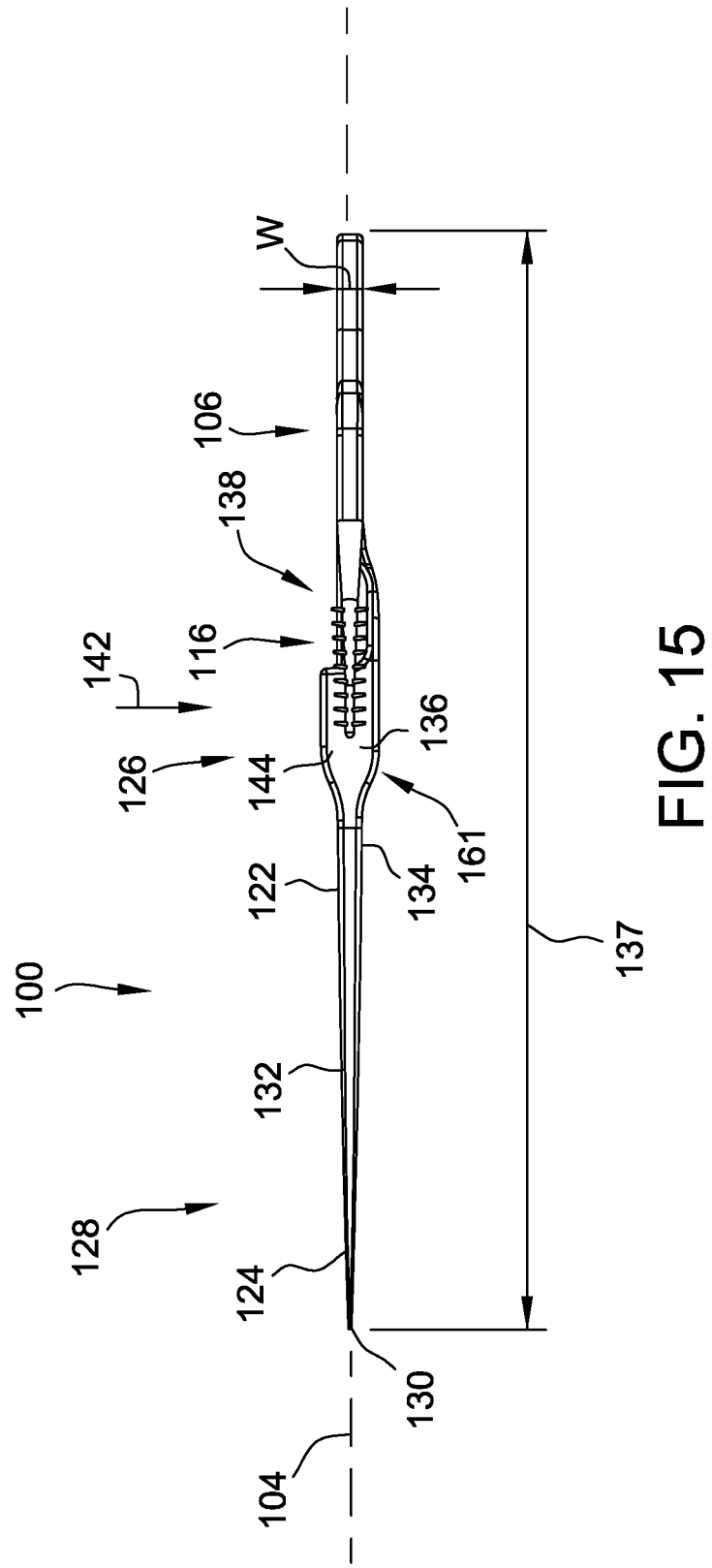
FIG. 15 is a top view of the dental cleaning tool seen in FIG. 9, the secondary cleaning tool being illustrated in the deployed position.

In addition, referring now to FIGS. 7 and 15, the body portion 102 includes a bulged side wall 161 formed on the second side 134 thereof. The bulged side wall 161 extends along the handle 122 of the body portion 102, and extends outward from the second side 134 of the body portion 102 such that a volume of the receiving slot 154 (shown in FIG. 8B) is increased.

In suitable embodiments, the dental cleaning tool 100 of FIGS. 1-18 may be formed in any suitable manner and of any suitable material. For example, the dental cleaning tool 100 may be formed from metal, wood, plastic, and/or combinations thereof. In one preferred embodiment, the dental cleaning tool 100 is molded or otherwise formed from a single piece of resilient synthetic material, such as, but not limited to, plastic or metal.

The dental cleaning tools described herein include a shield and a receiving slot formed on a handle of a floss assembly, and a secondary cleaning tool coupled to a bridge segment and selectively stowable or deployed from the receiving slot. The shield facilitates retaining the secondary cleaning tool within the receiving slot when in the stowed position, and restricts access to the receiving slot when the secondary cleaning tool is in the deployed position. As such, the secondary cleaning tool is restricted from being unintentionally deployed from the stowed position, or from being unintentionally stowed from the deployed position. Moreover, when in the stowed position, the secondary cleaning tool is integrated with the handle such that use of the floss assembly remains unimpeded. Furthermore, locating the secondary cleaning tool on the bridge segment such that a brush portion of the secondary cleaning tool overlaps the handle when the secondary cleaning tool is in the stowed position provides ergonomic storage of the secondary cleaning tool.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the disclosure, it is intended that all matter contained in the above description and shown in the accompanying drawings shall be interpreted as illustrative and not in a limiting sense.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dental cleaning tool comprising:
 a handle having a distal end, a proximal end, opposing first and second sides for gripping the dental cleaning tool between fingers and opposing upper and lower sides disposed between the first and second sides; and
 a floss assembly coupled to the proximal end of the handle, the floss assembly comprising a bridge segment, first and second arms extending transversely from the bridge segment, and floss extending between free ends of the first and second arms, wherein the bridge segment has an upper side continuous with and immediately adjacent the upper side of the handle and, wherein a longitudinal axis extends between distal and proximal ends of the handle and through the bridge segment; and a receiving slot provided in the proximal end of the handle, wherein the receiving slot is formed as a recessed portion in the first side of the handle and comprises an open proximal end, a closed distal end and a bottom surface extending therebetween, wherein the bottom surface of the receiving slot is continuous with the first side of the handle; and a shield having a first portion projecting from the upper side of the handle in a direction transverse to the first side of the handle and a second portion projecting inwardly to extend over at least a portion of the bottom surface of the receiving slot; and an elongate secondary cleaning tool coupled to the upper side of the bridge segment, wherein the secondary cleaning tool is pivotable relative to the bridge segment in at least two degrees of freedom wherein the secondary cleaning tool is configured to be rotated and inserted into the receiving slot to define a non-use position where the secondary cleaning tool is retained by the slot and shield, and is configured to be rotated out of the slot into a use position where the secondary tool extends outwardly from the bridge segment in a direction away from the floss assembly.

2. The dental cleaning tool in accordance with claim 1 further comprising a bendable tab extending between the upper side of the bridge segment and the secondary cleaning tool.

3. The dental cleaning tool in accordance with claim 2, wherein the bendable tab is dimensioned such that the secondary cleaning tool is pivotable in a first degree of freedom when a first force is applied thereto, and such that the secondary cleaning tool is pivotable in a second degree of freedom when a second force, greater than the first force, is applied thereto.

4. The dental cleaning tool in accordance with claim 1, wherein the shield comprises a first portion oriented to restrict access to the receiving slot from a first direction, and a second portion oriented to partially restrict access to the receiving slot from a second direction.

5. The dental cleaning tool in accordance with claim 4, wherein the first portion of the shield extends along the handle, and the second portion of the shield is oriented perpendicularly relative to the first portion.

6. The dental cleaning tool in accordance with claim 1, wherein the handle and the shield are formed as a monolithic integral structure.

7. The dental cleaning tool in accordance with claim 1 wherein the upper side of the handle comprises a finger tab opening immediately adjacent the first portion of the shield, and proximate the open proximal end of the slot.

8. The dental cleaning tool in accordance with claim 1, wherein the handle further comprises a toothpick member extending from the handle substantially parallel to the longitudinal axis.

9. The dental cleaning tool in accordance with claim 1, wherein the secondary cleaning tool comprises a bristled cleaning member.

10. A dental cleaning tool comprising:

a handle having a distal end, a proximal end, opposing first and second sides for gripping the dental cleaning tool between fingers and opposing upper and lower sides disposed between the first and second sides;

a floss assembly coupled to the proximal end of the handle, the floss assembly comprising a bridge segment, first and second arms, wherein the bridge segment has an upper side continuous with and immediately adjacent the upper side of the handle and, wherein a longitudinal axis extends between distal and proximal ends of the handle and through the bridge segment; and a receiving slot provided in the proximal end of the handle, wherein the receiving slot is formed as a recessed portion in the first side of the handle and comprises an open proximal end, a closed distal end and a bottom surface extending therebetween, wherein the bottom surface of the receiving slot is continuous with the first side of the handle the receiving slot being covered, in part, by a shield extending upwardly and laterally from a portion of the handle, and the shield being configured to cover the receiving slot such that access to the receiving slot is restricted from a first direction; and an elongate secondary cleaning tool coupled to the upper side of the bridge segment, wherein the secondary cleaning tool is pivotable relative to the bridge segment in at least two degrees of freedom the secondary cleaning tool being captured by and at least partially protected by the shield when the secondary cleaning tool is inserted into the receiving slot, wherein the secondary cleaning tool is configured to be rotated and inserted into the receiving slot to define a non-use position where the secondary cleaning tool is retained by the slot and shield, and is configured to be rotated out of the slot into a use position where the secondary tool extends outwardly from the bridge segment in a direction away from the floss assembly.

11. The dental cleaning tool in accordance with claim 10 further comprising a bendable tab extending between the upper side of the bridge and the secondary cleaning tool.

12. The dental cleaning tool in accordance with claim 11, wherein the bendable tab is dimensioned such that the secondary cleaning tool is pivotable in a first degree of freedom when a first force is applied thereto, and such that the secondary cleaning tool is pivotable in a second degree of freedom when a second force, greater than the first force, is applied thereto.

13. The dental cleaning tool in accordance with claim 10, wherein the shield is oriented parallel to the longitudinal axis of the handle.

14. The dental cleaning tool in accordance with claim 10, wherein the handle and the shield are formed as a monolithic integral structure.

15. The dental cleaning tool in accordance with claim 10, wherein the receiving slot defines a side opening on the first side of the handle, the side opening providing access to the receiving slot from the second side of the handle.

16. The dental cleaning tool in accordance with claim 10, wherein the upper side of the handle comprises a finger tab opening immediately adjacent the first portion of the shield, proximate the open proximal end of the slot.

17. The dental cleaning tool in accordance with claim 10, wherein the handle further comprises a toothpick member extending from the handle substantially parallel to the longitudinal axis.

18. A dental cleaning tool comprising:

a handle having a distal end, a proximal end, opposing first and second sides for gripping the dental cleaning tool between fingers and opposing upper and lower sides disposed between the first and second sides; and a floss assembly coupled to the proximal end of the handle, the floss assembly comprising a bridge segment, first and second arms extending transversely from the bridge segment, and floss extending between free ends of the first and second arms, wherein the bridge segment has an upper side continuous with and immediately adjacent the upper side of the handle and, wherein a longitudinal axis extends between distal and proximal ends of the handle and through the bridge segment; and a receiving slot provided in the proximal end of the handle, wherein the receiving slot is formed as a recessed portion in the first side of the handle and comprises an open proximal end, a closed distal end and a bottom surface extending therebetween, wherein the bottom surface of the receiving slot is continuous with the first side of the handle; and a shield having a first portion projecting from the upper side of the handle in a direction transverse to the first side of the handle and a second portion projecting inwardly to extend over at least a portion of the bottom surface of the receiving slot; and an elongate secondary cleaning tool coupled to the upper side of the bridge segment via a living hinge, the secondary cleaning tool being pivotable relative to the bridge segment about the living hinge in at least two degrees of freedom such that the secondary cleaning tool is insertable into the receiving slot by moving the secondary cleaning tool in at least two directions about the living hinge, the secondary cleaning tool being captured by and at least partially protected by the shield when the secondary cleaning tool is inserted into the receiving slot, wherein the secondary cleaning tool is configured to be rotated and inserted into the receiving slot to define a non-use position where the secondary cleaning tool is retained by the slot and shield, and is configured to be rotated out of the slot into a use position where the secondary tool extends outwardly from the bridge segment in a direction away from the floss assembly.

\* \* \* \* \*